United States Patent [19]
Bayya et al.

[11] Patent Number: 6,145,342
[45] Date of Patent: Nov. 14, 2000

[54] CATALYZED PREPARATION OF AMORPHOUS CHALCOGENIDES

[75] Inventors: Shyam S. Bayya, Falls Church; Cathy S. Scotto, Montclair, both of Va.; Jasbinder S. Sanghera, Greenbelt, Md.; Ishwar D. Aggarwal, Fairfax Station, Va.

[73] Assignee: The United States of America as represented by the Secretary of the Navy, Washington, D.C.

[21] Appl. No.: 09/016,334

[22] Filed: Jan. 30, 1998

[51] Int. Cl.$^7$ ..................................................... C03B 8/02
[52] U.S. Cl. ........................................ 65/17.2; 65/DIG. 15
[58] Field of Search ........................... 65/17.2, 390, 395, 65/388, 389, 440, DIG. 15; 501/12, 40

[56] References Cited

U.S. PATENT DOCUMENTS

| | | | |
|---|---|---|---|
| 4,308,171 | 12/1981 | Dines et al. | 502/167 |
| 4,439,464 | 3/1984 | Lauks | 427/76 |
| 4,704,299 | 11/1987 | Wielonski et al. | 501/40 |
| 4,704,371 | 11/1987 | Krolla et al. | 501/40 |
| 4,765,931 | 8/1988 | Saunders et al. | 252/584 |
| 5,093,286 | 3/1992 | Nogami et al. | 501/17 |
| 5,294,240 | 3/1994 | Sanghera et al. | 65/388 |
| 5,378,664 | 1/1995 | Becker et al. | 501/40 |
| 5,389,584 | 2/1995 | Aitken et al. | 501/40 |
| 5,392,376 | 2/1995 | Aitken et al. | 385/144 |
| 5,549,931 | 8/1996 | Dattatraya et al. | 427/376.2 |
| 5,585,640 | 12/1996 | Huston et al. | 250/483.1 |
| 5,599,751 | 2/1997 | Harbison et al. | 501/40 |
| 5,629,248 | 5/1997 | Aggarwal et al. | 501/40 |
| 5,764,661 | 6/1998 | Tawarayama et al. | 372/6 |
| 5,779,757 | 7/1998 | Sanghera et al. | 65/389 |
| 5,846,889 | 12/1998 | Harbison et al. | 501/40 |

FOREIGN PATENT DOCUMENTS

| | | |
|---|---|---|
| 1-183438 | 7/1989 | Japan. |
| 2-83236 | 3/1990 | Japan. |

OTHER PUBLICATIONS

Melling, Peter J, "Alternative Methods of Preparing Chalcogenide Glasses," Ceramic Bulletin, vol. 63, No. 11, pp. 1427–1429, 1984 (no month available).

Primary Examiner—Sean Vincent
Attorney, Agent, or Firm—Barry A. Edelberg; George A. Kap

[57] ABSTRACT

Sol-gel process conducted under an inert gas in a solvent at a temperature up to the boiling points of the solvent and by-products by reacting a chalcogen source, a glass network former-intermediate metal in the form of an alkoxide or a non-alkoxide and a catalyst to form a homogeneous product having average particle size of below 100 nm with catalyst, if the catalyst is a catalyst dopant, uniformly dispersed in the particles.

7 Claims, 3 Drawing Sheets

CATALYZED PREPARATION OF AMORPHOUS CHALCOGENIDES

BACKGROUND OF INVENTION

1. Field of Invention

This invention pertains to the catalyzed preparation of a chalcogenide glass and to chalcogenide glass having three or more components.

2. Background of Invention

Semiconductor materials, such as the sulfides of group IV(b) elements are promising materials for electronic devices and can be used for light transmission in the middle and far infrared spectral range since they are transparent to wavelengths from 2–15 µm. They also have low intrinsic transmission losses. For instance, germanium disulfide has ten times lower absorption than silica in the far IR region.

The electronic and optical properties of semiconductors are strongly affected by impurities and inhomogeneities in the material most of which are a result of the preparation process. By using an appropriate preparation, the light transmission losses of the prepared material can be minimized to the level of intrinsic optical losses based on the pure material properties.

The best material for light transmission applications would be a monocrystal, in order to minimize loss and maximize transparency. Since it is very difficult to produce a monocrystal in a desired shape, such as a fiber or a film, glasses are used to overcome these shortcomings.

Glass is a hard, amorphous, inorganic, usually transparent, brittle substance made by fusing silicate precursors, sometimes borate and phosphate precursors, with certain basic oxides and then rapidly cooling to prevent crystallization. The high temperature typically used in making glass is responsible for high level of impurities e.g., crucible materials, and limits the glass to components that can withstand the high temperatures. This means absence of organic components.

Similarly, chalcogenide glasses, such as $As_2S_3$, $As_2Se_3$ and $Ge_{30}As_{10}Se_{30}Te_{30}$, are typically made by heating the elemental starting materials in quartz ampules at temperatures between 750–1100° C. This also leads to impurities due to crucible reactions. Therefore, there is need for a low temperature process to make chalcogenide glasses.

The first attempt to synthesize a colloidal metal sulfide, an optical material, at room temperature using a low temperature process was done more than fifteen years ago. At that time, monodispersed cadmium sulfide was synthesized using cadmium nitrate and thioacetamide. By controlling the reaction conditions such as pH, concentration, temperature, and the nature of the anions, particle nucleation and growth were controlled to obtain a monodispersed cadmium sulfide sol.

A couple of years following the first attempt, an effort was made to sythesize metal sulfides from metal alkoxides and hydrogen sulfide. Using a sol-gel process, a germanium sulfide gel was produced by reacting germanium tetraethoxide dissolved in toluene with hydrogen sulfide gas bubbled through the solution. Since alkoxides easily hydrolyze, the reaction apparatus was previously purged with an inert gas. The reaction product was germanium sulfide gel with significant germanium oxide impurities. Subsequently, it was shown that the product was not pure germanium sulfide but a mixture of germanium sulfide and germanium oxide due to the presence of water as an impurity.

Others in the past have used organometallic compounds of zinc, aluminum and magnesium, and hydrogen sulfide as precursors. Metal sulfide particle aggregates were obtained.

Lanthanum sulfide was also made by bubbling hydrogen sulfide through lanthanum isopropoxide in dry benzene, as the solvent. The powder obtained was heat-treated in hydrogen sulfide finally producing single-phase crystalline lanthanum sulfide ($La_2S_3$).

Amorphous particles were also prepared by reacting titanium tetrapropoxide [$Ti(OC_3H_7)_4$] and hydrogen sulfide. Resulting powder was heat-treated in flowing hydrogen sulfide to produce crystalline titanium sulfide ($TiS_2$).

Considerable success has been achieved in terms of the solution synthesis of metal sulfides. The sol-gel process could be expected to provide a homogeneous product with a low level of impurities.

SUMMARY OF INVENTION

An object of this invention is to catalyze and thus increase reaction rate between a chalcogen source and a metal alkoxide or a metal halide many times and to produce an amorphous sol-gel product containing particles below 100 nanometers, more typically 5–50 nm.

Another object of this invention is to carry out the reaction to produce a doped amorphous metal chalcogenide at room temperature.

Another object of this invention is to widen the glass forming region by the use of the sol-gel process.

Another object of this invention is to increase amount of dopant in the metal chalcogenide product.

Another object of the invention is to produce a homogeneous doped metal chalcogenide containing three or more components.

These and other objects of this invention can be achieved by reacting a metal alkoxide or a metal halide with a chalcogenide source in a suitable solvent and in presence of a catalyst at a temperature up to the boiling point of the solvent and by-products, typically at room or ambient temperature.

DESCRIPTION OF PREFERRED EMBODIMENTS

Figure 1:
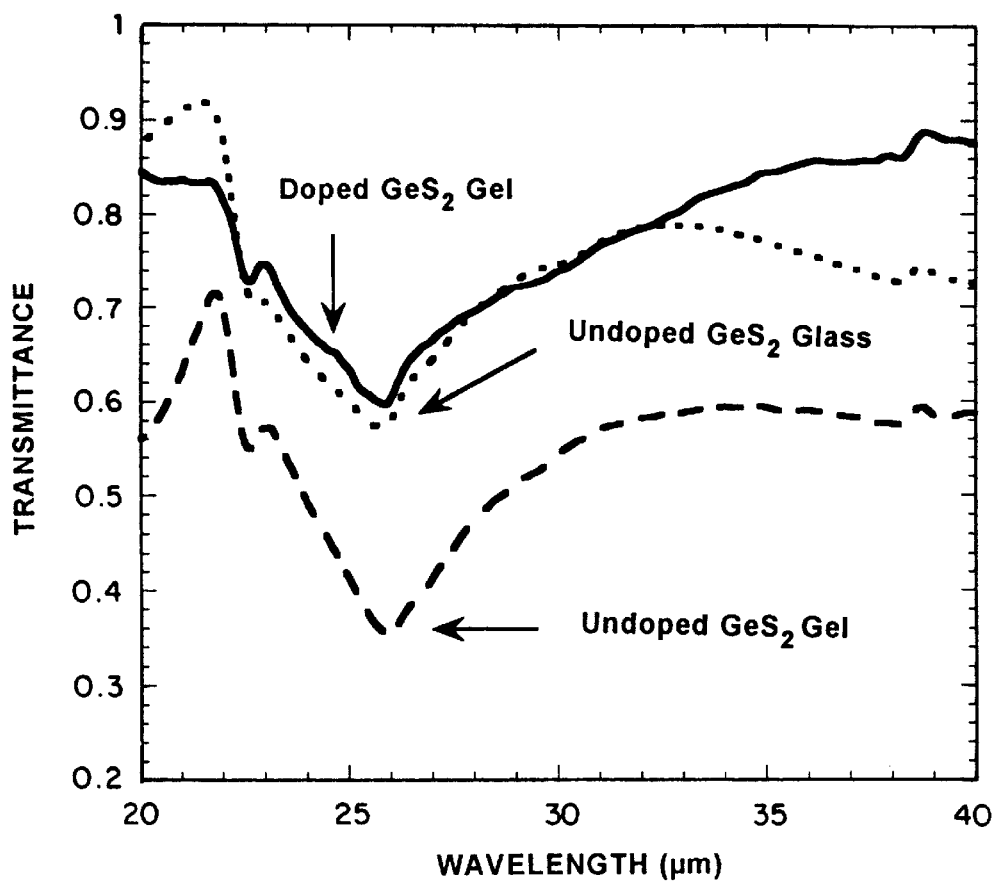
FIG. 1 is a transmittance plot for far IR comparing doped and undoped $GeS_2$ gels to $GeS_2$ glass prepared by the traditional melting route.

These objects are achieved by the preparation of catalyzed metal chalcogenide glasses at a temperature of up to the boiling points of the solvents and by-products under an inert atmosphere to produce homogeneous sols and gels at reaction rates that are many times faster than the prior art preparation of metal sols and gels in absence of a catalyst. This invention also includes homgeneous multicomponent product sols and gels prepared by the catalyzed process which products can be made into fibers, films, and monoliths, yielding cleaner or purer products and greater completion of the reaction.

The reaction is between a chalcogen source, a metal compound and a catalyst, all in a solvent. The reaction is carried out under an inert atmosphere typically at room temperature. The metal is typically in the form of a metal alkoxide or a halide and the inert atmosphere is non-reactive in that it is devoid of oxygen and moisture.

The chalcogen elements of the chalcogen source include sulfur, selenium and tellurium. For purposes herein, the preferred chalcogen is sulfur in the form of hydrogen sulfide although other chalcogen sources can be used. Thiols, dithianes, thiocarboxylic acids, thioacetamide, or thiourea can be used in place of hydrogen sulfide as a sulfide source. The chalcogen source is typically a gas that is bubbled through the metal alkoxides, or a liquid/solid that is predissolved in a solvent.

The metal in metal alkoxide and in metal non-alkoxide can be any glass network former-intermediate, particularly germanium, arsenic, gallium, antimony, indium, tin, thallium, lead, zinc, aluminum and magnesium. For purposes herein, of special interest are metals germanium, arsenic, gallium, lanthanum, antimony, indium, tin, thallium and lead. The metals used herein are typically in the form of lower alkyl alkoxides or halides but metal alkoxide can also be in the form of mixed ligand alkyl alkoxides.

The metal non-alkoxides can be halides, alkyls, allyls, aryls, dionates, and mixtures thereof, but are typically halides. As used herein, the alkyls include mixed ligand alkyl halides. When the metal non-alkoxide is used in the sol-gel reaction, the catalyst is also in the form of halides, alkyls, allyls and aryls but are typically halides. These reactants can be used in a one-step or a two-step reaction, as needed, to match the extent of reaction of the components and produce homogeneous sols and gels. The use of the metal non-alkoxide matrix and catalyst dopant will produce optically functional gels without any post heat treatment.

Specific examples of dionates include 2,4-pentanedionate, 1,1,1-trifluoro-2,4-pentanedionate, 1,1,1,5,5,5-hexafluoro-2,4-pentanedionate, 3,5-heptanedionate, 2,2,6,6-tetramethyl-3,5-heptanedionate, 3,5-octanedionate, and 6,6,7,7,8,8,8-heptafluoro-2,2-dimethyl-3,5-octanedionate.

A suitable catalyst is any compound that catalyzes the reaction and includes halogen acids, rare earth and transition metal compounds. The preferred halogen acid catalyst is hydrochloric acid which catalyzes the reaction and then evaporates leaving no trace thereof in the product. Although hydrochloric acid is not as fast as some of the other catalysts, fluorescence in the product, if present, is not quenched thereby.

Suitable rare earths, in the form of compounds that are soluble in the reaction medium, because of their emissions in the infrared, include cerium, praseodymium, neodymium, samarium, europium, terbium, dysprosium, holmium, erbium, thulium, and ytterbium. Preferred are erbium, praseodymium, dysprosium and neodymium. Because of their activity in the infrared region, suitable transition metals include titanium, vanadium, chromium, manganese, iron, cobalt, nickel and copper.

The rare earths and the transition metals have the dual function herein as catalysts and dopants. They catalyze or speed up the reaction and act as dopants because they remain in the metal chalcogenide product after formation. The rare earths and the transition metals are typically used in the form of compounds or precursors, such as lower alkoxides or non-alkoxides, and are also referred to herein as catalyst dopants.

The solvent herein is a solvent for the metal or metal compound chalcogen source and the catalyst. The solvent is devoid of dissolved oxygen and water and should have sufficient vapor pressure to facilitate drying by evacuation of the volatile components. Any suitable aprotic, protic solvent and mixtures thereof can be used in sufficient amount to solubilize the reactants. Specific examples of suitable solvents include toluene, benzene, hexane, toluene/ethanol, and toluene/diethylether mixtures. In case of one or more reactants, particularly the metal or metal compound, that are liquid at about room temperature, these reactants, preferably in excess, may have the dual function of reactant and solvent. The chalcogen source is typically a gas and its solubility is of no concern here.

Amount of the metal alkoxides or metal non-alkoxides and the chalcogen source can be stoichiometric whereas amount of the catalyst dopant should be from a minimum, which perceptively accelerates the reaction rate to a maximum, that can be solubilized by the reaction medium. Typically, amount of the catalyst dopant is 100–100,000 ppm, based on the weight of the rare earth or the transition metal in the product. If a gaseous catalyst is used, such as a halogen acid, which is bubbled through the reaction solution, amount thereof is from a minimum which perceptably accelerates the reaction rate to a maximum which gelatinizes the product. Amount of a gaseous catalyst is typically 5 to 10 mole % of the metal precursor.

Catalysts used herein (1) accelerate the reaction and (2) drive the reaction to greater completion. The reaction rate acceleration is many times and is typically at least ten times that of the prior art reaction rate, which is typically 10–12 hours. The second effect is proved by a comparison of thermal and spectroscopic analytical data for both doped and undoped gels. DSC thermograms of undoped gels show a significant exotherm at about 340° C. attributed to the contribution of germanium bound ethoxide groups, whereas this exotherm is absent in doped samples. Similarly, diffuse reflectance IR spectroscopy (DRIFTS) analysis of undoped gels reveals an absorption band at 7.91 $\mu$m which band is believed to be due to Ge—OEt and is absent in doped samples. The greater converison of bound alkoxides to parent alcohol in the product gel facilitates subsequent removal of fluorescence quenchers and improves IR transparency.

When reaction rates of different components are about the same, meaning that the intended reaction proceeds, a one-step process can be used to prepare a homogeneous metal chalcogenide product. However, when reaction rates of different components differ, a two-step or a multi-step process can be used. In a two-step process, the slower reacting species is pre-reacted to an intermediate stage followed by addition of the faster reacting species. The timing of the addition of the second component becomes critical and requires an understanding of the reaction mechanisms. Progress of the reaction and the pre-reaction can be followed by the Tyndall effect.

An example of this is formation of Ga—Ge—S gel. When germanium tetrachloride ($GeCl_4$) and gallium trichloride ($GaCl_3$) are mixed in a single-step in toluene and reacted with hydrogen sulfide ($H_2S$), gallium trichloride reacts too quickly with hydrogen sulfide and forms a gallium sulfide precipitate that separates from the germanium species in solution. This occurs because gallium chloride reacts with hydrogen sulfide much faster than germanium chloride and the product is not a homogeneous Ga—Ge—S gel but a gel that contains $Ga_2S_3$ crystals.

When germanium tetraethoxide [$Ge(OEt)_4$] or [$Ge(OC_2H_5)_4$] and gallium trichloride ($GaCl_3$) are mixed in toluene and reacted with hydrogen sulfide, although germanium tetraethoxide is a faster reacting species than germanium tetrachloride, the reaction still occurs too quickly and Ga—Ge—S precipitates out within minutes as large agglomerated particles.

However, in a two-step catalyzed process of this invention, germanium tetraethoxide or germanium tetrachloride is first pre-reacted or partially reacted with hydrogen sulfide in toluene to form Ge—SH oligomers and polymers in solution. Extent of pre-reaction can be determined empirically. Subsequent addition of gallium trichloride in a second step produces a three-dimensional Ga—Ge—S network in a homogeneous gel. Similarly, a rare earth metal compound, such as erbium trichloride, can be added to the pre-reacted or partially thiolyzed $Ge(OEt)_4$ or $GeCl_4$ or even to the partially reacted (Ga,Ge)—SH species obtained from the two-step process discussed above.

Another way of matching the extent of reaction of different components in the sol-gel process is by selecting appropriate precursors to match their reaction rates. An example of this process is a reaction between hydrogen sulfide and a mixture of tetraethyl germanium $(GeEt)_4$ and gallium trichloride $(GaCl_3)$ in toluene. In this case, the reaction rate of $GeEt_4$ exceeds that of $Ge(OEt)_4$ and approaches that of gallium trichloride.

Alternatively, either bulky alkyl groups or organothiolate ligands $(RS^-)$ on highly reactive metal centers slow the net condensation rate to match that of the slower reacting metal compounds. The thiolate ligands, or other sulfur sources such as thiocarboxylic acids, thiourea, or thioacetamide, may replace some or all of the hydrogen sulfide in the sol-gel process as a further control on the overall reaction rate. When multifunctional ligands are used, as in alkyl dithiolate metal complexes, for example, the ligand's ability to chelate a single metal ion, as in $[M(SR_n)_y]$ and to bridge adjacent metal ions, as in $[MSR_nS—M]$, provides control not only of the reaction rate but also of the microstructure of the resulting sol and gel networks. Bridging is obtained if the alkyl radical R contains more than 3 carbon atoms and chelation is obtained if the alkyl radical R contains less than 3 carbon atoms. Thus, either discrete particulate clusters or extended polymeric structures can be obtained by this process.

When using erbium to catalyze the reaction, presence of alkoxy groups, for instance, as alcohol by-product from the metal alkoxide reactant, can quench fluorescence of the $Er^{+3}$ emission at 1.5 µm as a result of the O—H overtone absorption at about 1.4 µm. However, fluorescence can be restored when the gels are dried and all the by-product alcohols and bound alkoxy groups are removed. This applies to erbium and the other rare earths. The one-step or the two-step or the multi-step approach may incorporate a solvent exchange process or partial solvent distillation under vacuum followed by replenishment with a dry, degassed solvent that can be repeated, as needed, in order to remove the alcohol solvent and by-products from the sol.

The product of the reaction can be a sol which can be used as a coating or converted to a gel by gelation of the sol and the gel can be further converted by evaporation to xerogel which can be converted to a dense material by application of heat. A porous product results by removal of the solvent from a gel without replacing the removed solvent with something else. The sol condition is reached rather quickly in the process disclosed herein and is characterized by the reaction mixture becoming cloudy by exhibiting the Tyndall effect. The Tyndall effect is typically realized when particles in the reaction mixture are at least oligomers (greater than 1 nm) and scatter light.

The sol-gel reaction can be completed by either aging the sol or by further reaction with a chalcogen source.

The product metal chalcogenide sols or gels can be fabricated into thin films or into bulk forms. Dried gels can be treated either thermally under an inert atmosphere or the chalcogen source atmosphere or with a halogen gas or plasma of the halogen gas to remove all the organic impurities before any sintering at elevated temperature.

In the one-step or the multi-step reactions to make homogeneous sols or gels, reaction and processing conditions can be controlled to produce (1) doped chalcogen particles, (2) stable doped chalcogen sols, i.e., colloidal suspensions of oligomeric or particulate solids in a liquid for subsequent film deposition, and (3) doped chalcogen monolithic bodies. As demonstrated in the examples that follow, these conditions include choice of metal and chalcogen sources, reagent concentration and stoichiometric ratios, concentration of additives, and reaction and aging temperatures. All procedures in the examples below were conducted under an inert atmosphere using standard anaerobic techniques.

Having described the invention, the following examples are given as particular embodiments thereof and to demonstrate the practice and advantages thereof. It is understood that the examples are given by way of illustration and are not intended to limit the specification or the claims in any manner.

EXAMPLE 1

This example demonstrates the prior art sol-gel reaction carried out without a catalyst.

Undoped $GeS_2$ gel was prepared from $H_2S$ and $Ge(OEt)_4$ according to known procedures with minor variations, as follows. A 10.0 mL aliquot of $Ge(OEt)_4$ ($4.24 \times 10^{-2}$ mol) was transferred under argon atmosphere into 100 mL of anhydrous, Ar-purged toluene. After bubbling a mixture of $H_2S$ and Ar (59% $H_2S$, 41% Ar) at about 100 ccm through the originally transparent solution for 8.5 hours, a Tyndall effect signalled the transformation from solution to sol. Continued bubbling of the $H_2S$/Ar gas mixture through the sol for another 4.5 hours did not significantly change the sol's appearance. In order to promote the sol-to-gel transformation, solvent and dissolved $H_2S$ were evaporatively reduced by Ar gas flow or vacuum, (i) with or (ii) without heating. Time to Tyndall effect was 8.5 hours of $H_2S$/Ar gas flow.

(i) For example, heating the sol at 90–105° C. for 8 hours under $H_2S$/Ar gas flow fostered both particle growth and solvent reduction to produce an opaque sol. Subsequent Ar purging of solvent and excess $H_2S$ at 80–90° C. for about 5 hours reduced the sample volume to about 30 mL. On cooling, volume gelation of the entire sol took place immediately. Time to gel from Tyndall effect was 17.5 hours.

(ii) Alternatively, evaporation of volatiles by slow Ar flow at ambient temperature for two days caused volume gelation of the sol with minimal solvent loss. Time to gel from Tyndall effect was less than 68 hours and was not recorded precisely since the sol was left to stand over the weekend.

Product gels were dried by vacuum or Ar flow at ambient or elevated temperatures of 60–105° C. prior to characterization.

EXAMPLE 2

This example details the steps to make doped $GeS_2$ gels at accelerated rates using the one step process described above at two dopant concentrations.

(i) A solution of 0.205 g $ErCl_3$ ($7.47\times10^{-4}$ Mol) in 10.0 mL $Ge(OEt)_4$ ($4.24\times10^{-2}$ mol) was added quantitatively to 150 mL anhydrous toluene under Ar. (0.205 g $ErCl_3$ in 10 mL of $Ge(OEt)_4$ corresponds to 2.6 wt % of $Er_2S_3$ in the resulting $GeS_2$ gel.) A mixture of $H_2S$ and Ar (16% $H_2S$, 84% Ar) at about 100 ccm was bubbled through the transparent solution with rapid stirring. Within 1 hour, the solution became a thick, white froth. After 6.25 hours of additional $H_2S$/Ar gas flow, the sol was a viscous white liquid that completely gelled on heating to 95° C. for 1.25 hours under Ar. Time to Tyndall effect was less than 1 hour. Time to gel from Tyndall effect was about 7.5 hours of $H_2S$/Ar gas flow.

(ii) To a solution of 0.057 g $Er(OPr^i)_3$ ($1.7\times10^{-4}$ mol) in 10.0 mL $Ge(OEt)_4$ ($4.24\times10^{-2}$ mol $Ge(OEt)_4$, 0.61 wt % $Er_2S_3$ in $GeS_2$) was added 100 mL toluene under Ar. A mixture of $H_2S$ and Ar (16% $H_2S$, 84% Ar) at about 100 ccm was bubbled through the transparent solution. A Tyndall effect was observed after 20 minutes and the sol became opaque white within 5 more minutes. Both the $H_2S$/Ar gas flow and stirrer were turned off. Within 15 minutes the entire volume of the sol gelled. After vacuum-drying the gel at ambient temperature, 6.0 g of solid was recovered. Time to Tyndall effect was 20 minutes. Time to gel from Tyndall effect was 5–20 minutes.

Figure 2:
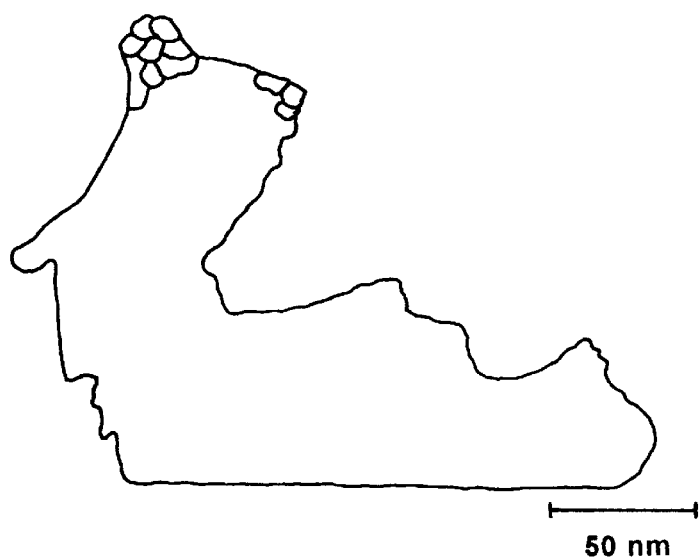
FIG. 2 is a TEM image of $GeS_2$ particulate gel as prepared in Ex. 2 showing average particle size of about 10 nm.

FIG. 1 confirms the presence of $GeS_2$ in both doped and undoped gels by the characteristic absorption at 25.8 µm in the infrared transmission spectra. For comparison, the far-IR spectrum of $GeS_2$ glass as prepared by the traditional high temperature melt process is also shown. Transmission electron microscopy (TEM) analysis of the doped gel prepared in Example 2(i) shown in FIG. 2 shows a particle size of about 10 nm.

Figure 3:
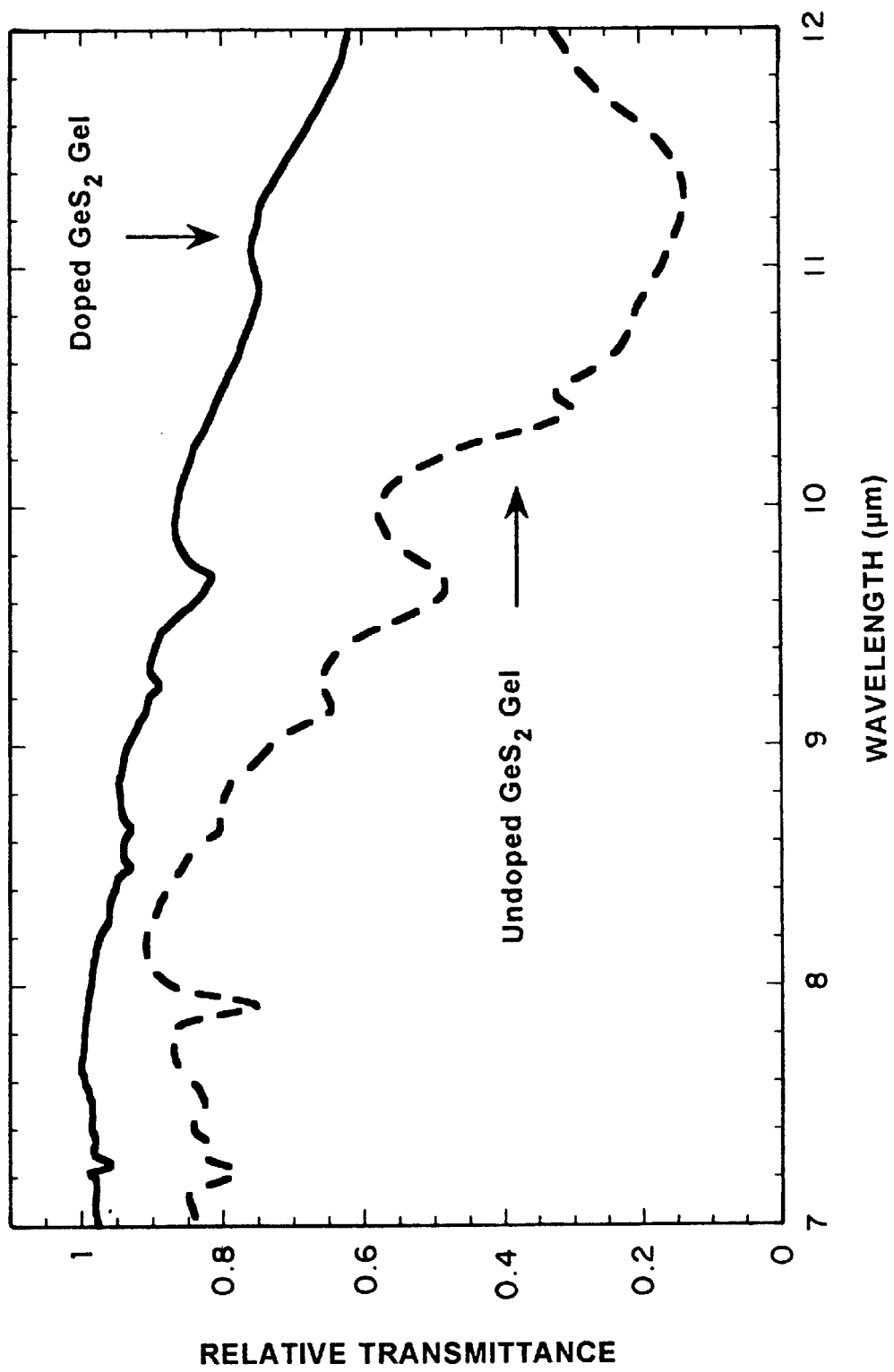
FIG. 3 is a DRIFTS transmittance plot of doped and undoped $GeS_2$ gels prepared in Exs. 1 and 2, both sampled at 5 wt % in KBr.
Figure 4:
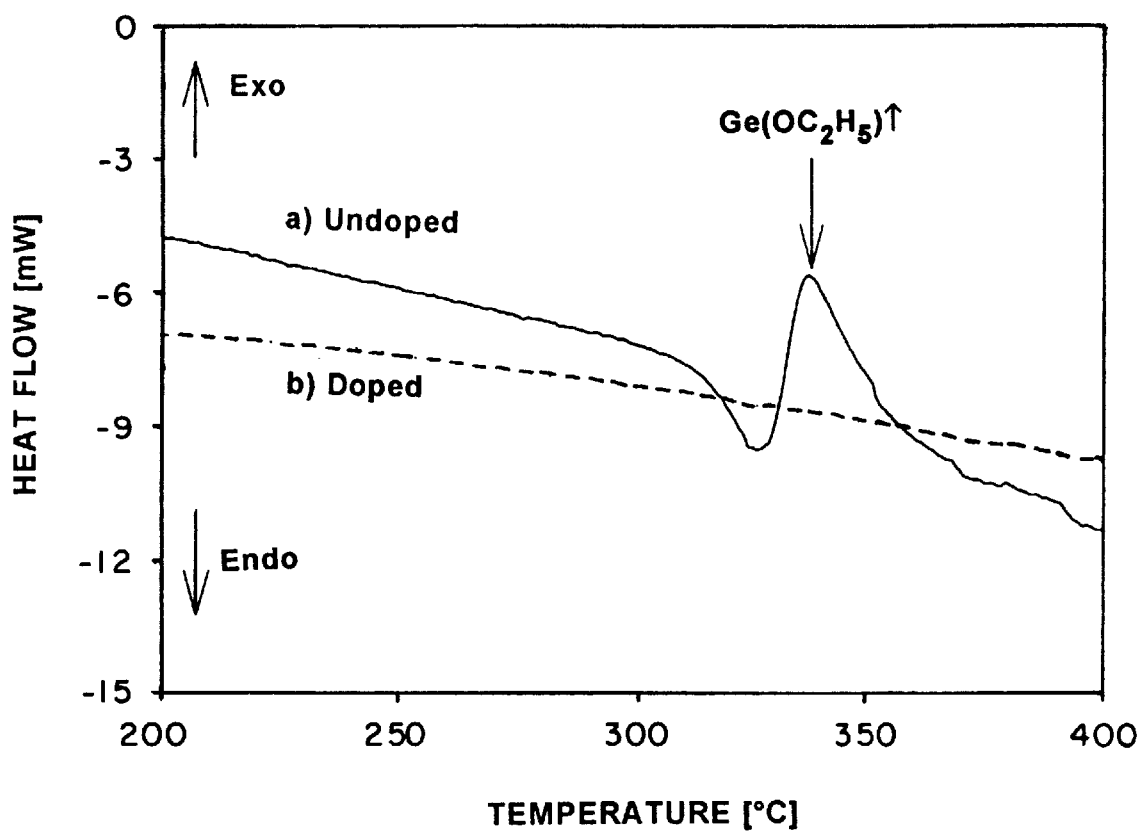
FIG. 4 is a DSC trace for undoped and doped $GeS_2$ gels, the undoped gel exhibiting an exotherm at about 340° C. which is due to unreacted metal alkoxide, which exotherm is absent in the doped sample indicating more complete reaction.

FIGS. 3 and 4 illustrate the differences in extents of reaction between doped and undoped gels. The mid-IR DRIFT spectra of samples at identical dilutions in KBr (5 wt %) reveal significantly reduced transmission above about 9 µm in the undoped gel. Thermal analysis of both gels shows a large exothermic peak at about 340° C. in the undoped sample that is absent in the doped gel. The temperature of this exotherm corresponds to the loss of bound alkoxide groups. This result suggests that the $ErX_3$ dopant not only accelerates the net gelation time, but also shifts the equilibrium in the net sol-gel reaction to produce a $GeS_2$ product with substantially lower residual ethoxide content. That is, the dopant drives the thiolysis and condensation reactions nearly to completion.

EXAMPLE 3

In this example, anhydrous hydrogen chloride, HCl, was used to catalyze the sol-gel synthesis of $GeS_2$. This allowed the rare earth dopant concentration to be controlled independently of the amount of catalyst. A 10.0 mL aliquot of $Ge(OEt)_4$ ($4.24\times10^{-2}$ mol) was mixed with 100 mL of anhydrous toluene under Ar. Separately, 99.997% electronic grade HCl gas was bubbled through a second sample of anhydrous toluene for 15 minutes. On the basis of the reported solubility of HCl in benzene, the concentration of HCl in toluene at saturation was estimated at 0.1 g HCl/mL toluene. To the $Ge(OEt)_4$/toluene mixture was added 0.6 mL of HCl-saturated toluene (about 2 mmol HCl). After bubbling a mixture of $H_2S$ and Ar (59% $H_2S$, 41% Ar) at about 100 ccm through the transparent solution for 45 minutes, no change in solution appearance was observed. A second 0.5 mL aliquot of HCl-saturated toluene (about 1.5 mmol HCl) was added and the gas flow continued as before. Observation of Tyndall effect was noted after an additional 1 hour, or 1.75 hours total time of $H_2S$/Ar gas flow. In contrast to Example 2(ii), gelation did not rapidly follow the appearance of the Tyndall effect. Rather, an additional 8.25 hours of $H_2S$/Ar flow was required to achieve volume gelation of the sol to a white, opaque gel. Time to Tyndall effect was 1.75 hours; time to gel from Tyndall effect was 8.25 hours.

EXAMPLE 4

This example describes the procedure to make a fluorescent $GeS_2$:$Er^{3+}$(i) powder by the two-step process described above or (ii) gel using an alternative sulfur source, and illustrates the effect of the sulfide precursor on the morphology of the product.

(i) Five mL of $GeCl_4$ ($4.4\times10^{-2}$ mol) in 50 mL of distilled toluene was pre-thiolyzed with $H_2S$/Ar (16% $H_2S$, 84% Ar) bubbling through the reaction mixture at 250 ccm for 12 hours. To a 2 mL aliquot of this solution was added 0.006 g of $GaCl_3$ ($4\times10^{-5}$ mol) and 0.005 g of $ErCl_3$ ($2\times10^{-5}$ mol). The freshly-prepared mixture exhibited fluorescence at 1.5 µm. The $H_2S$/Ar flow continued for another 30 minutes, after which the sample still showed fluorescence. Precipitation occurred after 24 hours aging at room temperature. Fluorescence was quenched in the aged powder as a result of the high concentration of $Er^{3+}$ that was used in this example.

(ii) A mixture of 0.05 g of $GaCl_3$ ($3\times10^{-4}$ mol) and 0.01 g of $ErCl_3$ ($4\times10^{-5}$ mol) was added to 1 mL of $GeCl_4$ ($9\times10^{-3}$ mol). One mL of 1,2-ethanedithiol ($1\times10^{-2}$ mol), the protonated form of a bidentate ligand, was added to this mixture and the contents were sealed to gel. Prior to gelation, the as-prepared mixture exhibited fluorescence at 1.5 µm. A translucent gel resulted after 24 hours aging at room temperature. As in Example 4(i) above, fluorescence was quenched in the aged gel as a result of the high concentration of $Er^{3+}$ that was used. Samples with lower dopant levels are expected to remain fluorescently active in the 3–5 µm region.

EXAMPLE 5

This example describes the two-step preparation of a doped colloidal $Ge(OEt)_x(SH)_yS_z$ sol for the purpose of fabricating thin films. The sol was stable for months under an inert atmosphere.

A two-step procedure in combination with stoichiometric controls afforded an $Er^{3+}$-doped, colloidal $Ge(OEt)_x(SH)_yS_z$ sol that gelled only on solvent removal. Pre-thiolysis of 10.0 mL $Ge(OEt)_4$ ($4.24\times10^{-2}$ mol) in 100 mL distilled, Ar-purged toluene with $H_2S$/Ar gas (59% $H_2S$, 41% Ar) at about 100 ccm produced a barely-discernible Tyndall effect after 1.5 hours reaction. Forty-five minutes of additional $H_2S$/Ar gas flow was followed by a 10 minute Ar purge. Next a slurry of 0.011 g $Er(OPr^i)_3$ ($3.2\times10^{-5}$ mol $Er(OPr^i)_3$, 0.12 wt % $Er_2S_3$ in $GeS_2$) in 40 mL toluene was added to the reaction. $H_2S$/Ar gas flow through the reaction for 9 hours followed by an Ar purge of excess $H_2S$ resulted in a moderate Tyndall effect but gave a stable sol that did not gel on standing.

Thin films of about 1 µm in thickness were deposited by dip-coating substrates into the sol described, either before or after aging the sol in a sealed container at 50–70° C.

The sol-gel synthesis of the doped metal chalcogenide has several advantages. Because of the high purity chemicals used in the sol-gel process, impurities are reduced and hence reduce the losses in the fibers drawn from the sol-gel derived pre-forms. The porous pre-forms before sintering, can also be treated with a chlorine gas or plasma as an additional step to clean the surface of the gel. The sol-gel process allows the incorporation of higher mole fractions of the rare earth ions in the chalcogenide glasses than traditional melting. The solubility of these ions in the chalcogenide glasses is very much limited when prepared by the traditional glass melting routes. The sol-gel process widens the glass forming regions which allows preparation of stable glasses with compositions which have never been explored before. The sol-gel process allows the formation of optical quality thin films at low or even room temperatures for waveguide or IR chemical sensor applications. Another advantage resides in the fact that chemical sensing materials prepared in the manner disclosed herein may employ organic, metal organic, and metal oxide compounds as dopant probes within the host. Also, a chalcogenide matrix has a wider IR transmission window of 2–15 $\mu$m than oxides.

While presently preferred embodiments have been shown of the novel process and product, and of the several modifications discussed, persons skilled in this art will readily appreciate that various additional changes and modifications may be made without departing from the spirit of the invention as defined and differentiated by the following claims.

What is claimed is:

1. A process comprising the step of reacting, under an inert gas in a liquid solution, a non-oxide chalcogen source, a metal compound in the form of an alkoxide or a non-alkoxide, and a hydrogen chloride catalyst to produce an amorphous non-oxide chalcogenide homogeneous product; the non-alkoxide is selected from the group consisting of halides, alkyls, allyls, aryls, dionates, and mixtures thereof; and a reaction medium is present which is comprised of the product, the chalcogen source and the metal compound, or any part thereof; wherein the solution comprises at least one solvent selected from the group consisting essentially of aprotic solvents, protic solvents, liquid reactants that are liquid at about room temperature, and mixtures thereof; wherein amount of the catalyst is from a minimum which accelerates the reaction to a maximum that can be solubilized by the solvent; wherein reaction temperature is up to the lowest boiling points of the solvent and by-products; wherein the metal in the metal compound is selected from the group consisting of germanium, arsenic, gallium, lanthanum, antimony, indium, tin, thallium, lead, zinc, aluminum, manganese, and mixtures thereof.

2. A process comprising the step of reacting, under an inert gas in a liquid solution, a non-oxide chalcogen source, a metal compound in the form of an alkoxide or a non-alkoxide, and a catalyst to produce an amorphous non-oxide chalcogenide homogeneous product; the non-alkoxide is selected from the group consisting of halides, alkyls, allyls, aryls, dionates, and mixtures thereof; wherein a reaction medium is present which is comprised of the product, the chalcogen source and the metal reactant, or any part thereof; wherein the solution comprises at least one solvent selected from the group consisting essentially of aprotic solvents, protic solvents, liquid reactants that are liquid at about room temperature, and mixtures thereof; wherein reaction temperature is up to the lowest boiling points of the solvent and by-products; wherein the metal in the metal compound is selected from the group consisting of germanium, arsenic, gallium, lanthanum, antimony, indium, tin, thallium, lead, zinc, aluminum, manganese, and mixtures thereof; wherein the catalyst is a catalyst dopant and its amount in the product is 100–100,000 ppm, the product having the catalyst dopant uniformly dispersed therethrough; wherein the chalcogen source is hydrogen sulfide and the process further includes the step of bubbling hydrogen sulfide through the reaction medium until the reaction medium exhibits the Tyndall effect; and the catalyst dopant is selected from the group consisting of compounds of cerium, praseodymium, neodymium, samarium, europium, terbium, dysprosium, holmium, erbium, thulium, ytterbium, titanium, vanadium, chromium, manganese, iron, cobalt, nickel, copper, and mixtures thereof.

3. The process of claim 2 wherein the catalyst is in the form of a lower alkyl alkoxide or a chloride.

4. The process of claim 3 wherein the metal compound includes a slower reactant and a faster reactant and wherein the chalcogen source is gaseous, which process includes the step of pre-reacting the slower reactant with the gaseous chalcogen source and reacting the pre-reacted reactant with the faster reactant.

5. The process of claim 3 wherein the metal compound is in the form of a lower alkyl alkoxide and the catalyst dopant is in the form of a lower alkyl alkoxide or a chloride.

6. The process of claim 3 wherein the catalyst dopant is a chloride.

7. A process comprising the step of reacting, under an inert gas in a liquid solution at a temperature up to the lowest boiling points of the solvent and by-products, a metal compound in the form of a lower alkyl alkoxide or a chloride with hydrogen sulfide and a catalyst dopant to produce a homogeneous amorphous chalcogenide product having the catalyst dopant dispersed through the product, the metal in the metal compound is a network former/intermediate selected from the group consisting of germanium, arsenic, gallium, lanthanum, antimony, indium, tin, thallium, lead, zinc, aluminum, and mixtures thereof; wherein the solution comprises at least one solvent selected from the group consisting essentially of aprotic solvents, protic solvents, metallic reactants that are liquid at about room temperature, and mixtures thereof; and wherein the catalyst dopant is selected from the group consisting of compounds of cerium, praseodymium, neodymium, samarium, europium, terbium, dysprosium, holmium, erbium, thulium, ytterbium, titanium, vanadium, chromium, manganese, iron, cobalt, nickel, copper, and mixtures thereof; wherein the metal compound includes a slower reactant and a faster reactant and wherein the chalcogen source is gaseous, which process includes the step of pre-reacting the slower reactant with hydrogen sulfide and reacting the pre-reacted reactant with the faster reactant; and wherein the catalyst dopant is selected from the group consisting of lower alkoxides, chlorides, and mixtures thereof.

* * * * *